(12) United States Patent
Kunnumma et al.

(10) Patent No.: US 11,720,649 B2
(45) Date of Patent: Aug. 8, 2023

(54) SYSTEM AND METHOD FOR CLASSIFICATION OF DATA IN A MACHINE LEARNING SYSTEM

(71) Applicant: EdgeVerve Systems Limited, Bangalore (IN)

(72) Inventors: Niraj Kunnumma, Bangalore (IN); Rajeshwari Ganesan, Palo Alto, CA (US); Bhavana Bhasker, San Jose, CA (US)

(73) Assignee: EDGEVERVE SYSTEMS LIMITED, Bangalore (IN)

( * ) Notice: Subject to any disclaimer, the term of this patent is extended or adjusted under 35 U.S.C. 154(b) by 792 days.

(21) Appl. No.: 16/458,520

(22) Filed: Jul. 1, 2019

(65) Prior Publication Data
US 2020/0320430 A1 Oct. 8, 2020

(30) Foreign Application Priority Data
Apr. 2, 2019 (IN) .............................. 201941013239

(51) Int. Cl.
*G06F 17/18* (2006.01)
*G06F 18/21* (2023.01)
(Continued)

(52) U.S. Cl.
CPC ............ *G06F 18/217* (2023.01); *G06F 17/18* (2013.01); *G06F 18/24* (2023.01); *G06N 20/00* (2019.01)

(58) Field of Classification Search
CPC ....... G06N 20/00; G06F 17/18; G06K 9/6267
See application file for complete search history.

(56) References Cited

U.S. PATENT DOCUMENTS 8,943,043 B2 * 1/2015 Lymberopoulos ........................... G06F 16/9574 707/721
10,353,951 B1 * 7/2019 Li ............................. G06N 3/08
(Continued)

FOREIGN PATENT DOCUMENTS

CN 107145907 A 9/2017
WO WO-2019190886 A1 * 10/2019 ............. G06F 21/16

OTHER PUBLICATIONS

Nguyen, H. T. et al., "Active Learning Using Pre-Clustering", Proceedings of the 21st International Conference on Machine Learning, Banf, Canada, pp. 1-8, 2004.
(Continued)

*Primary Examiner* — Scott C Anderson
(74) *Attorney, Agent, or Firm* — Troutman Pepper Hamilton Sanders LLP (Rochester)

(57) ABSTRACT

Disclosed are a system, method and apparatus for classification of data in a machine learning system. In one aspect, a method for classification of data in a machine learning system through one or more computer processors is disclosed. Further, generating, through one or more computer processors, a data classifier using a first dataset and determining an accuracy value of the data classifier to achieve a predefined model accuracy threshold. Still further, iterating, through one or more computer processors, calibration of the first dataset based on a set of parameters until the accuracy value matches or exceeds the predefined model accuracy threshold value. Further, the calibration comprises a user input to indicate a correctness of a presented subset of data from a second dataset and using the above to generate an enhanced data classifier for the classification of data.

17 Claims, 3 Drawing Sheets

(51) Int. Cl.
*G06N 20/00* (2019.01)
*G06F 18/24* (2023.01)

(56) References Cited

U.S. PATENT DOCUMENTS

| | | | |
|---|---|---|---|
| 10,474,714 B2* | 11/2019 | Grigorov | G06F 16/5866 |
| 2007/0150801 A1 | 6/2007 | Chidlovskii et al. | |
| 2008/0103849 A1* | 5/2008 | Forman | G06Q 10/06375 |
| | | | 705/306 |
| 2013/0073568 A1* | 3/2013 | Federov | G06F 16/9535 |
| | | | 707/E17.069 |
| 2013/0097103 A1 | 4/2013 | Chari et al. | |
| 2016/0110657 A1* | 4/2016 | Gibiansky | G06N 20/00 |
| | | | 706/12 |
| 2017/0215768 A1* | 8/2017 | Belfiori | G06F 18/24133 |
| 2018/0225587 A1* | 8/2018 | Khidekel | G06Q 10/04 |
| 2019/0188561 A1* | 6/2019 | Tang | H04L 67/26 |
| 2020/0104777 A1* | 4/2020 | Bouhini | G06N 20/00 |
| 2020/0175324 A1* | 6/2020 | Takahashi | G06T 7/11 |

OTHER PUBLICATIONS

Arora, S., et al., "Active Learning for Natural Language Processing", Language Technologies Institute, School of Computer Science, Carnegie Mellon University, pp. 1-31, 2007.

Singh, A., et al., "K-means with Three Different Distance Metrics", International Journal of Computer Applications, vol. 67, No. 10, pp. 13-17, Apr. 2013.

Leskovec et al., Mining of Massive Datasets, "Clustering", chapter 7, pp. 241-280, 2012.

"Why does k-means clustering algorithm use only Euclidean distance metric?", https://stats.stackexchange.com/questions/81481/why-does-k-means-clustering-algorithm-use-only-euclidean-distance-metric?utm_medium=organic&utm_source=google_rich_qa&utm_campaign=google_rich_qa, last accessed May 11, 2020.

"Model Evaluation—Classification", http://www.saedsayad.com/model_evaluation_c.htm, last accessed May 11, 2020.

* cited by examiner

SYSTEM AND METHOD FOR CLASSIFICATION OF DATA IN A MACHINE LEARNING SYSTEM

This application claims the benefit of Indian Patent Application Serial No. 201941013239 filed Apr. 2, 2019, which is hereby incorporated by reference in its entirety.

FIELD

The present invention relates to a system, method and apparatus for classification of data in a machine learning system. More specifically, it relates to determining candidates for disambiguation in an iterating process of calibration of a dataset using user metrics and other machine learning metrics.

BACKGROUND

Machine learning generally includes the construction or generation of machine learning algorithms that can learn from data. These algorithms are used to build a model based on features that is used to generate a classifier tuned to a particular purpose. Historically, whether training examples were labeled or unlabeled has been based on the particular purpose.

Supervised machine learning approaches require labelled data for training and testing the model. In many real-world scenarios, it is very time-consuming and difficult to obtain labelled data. The data for labelling can be either text, images, or any other multimedia content. Since specialists are required to label the data, the labelling process often exerts some stress on human annotators. The fatigue and latency along with interruption causes quality of annotated data to deteriorate. The process of labelling the data is an expensive and time consuming process. One way of addressing this issue is by using a paradigm in machine learning called active learning, where the machine automates the data labelling task and determines a set of data that would require human intervention.

Various approaches are followed to select such data in active learning for human annotation or disambiguation. Such known approaches are either heuristic methods or use clustering approaches where a group of similar data are considered together and the outlier candidates are chosen for labelling. However, the time taken by the user to tag the data and the fatigue encountered during the tagging, adversely affect the quality of tagging.

All these algorithms aim to determine the candidates to be presented to the user for labelling. Proper determination of candidates is essential for an effective model of active learning. If the number of candidates in the set is too high, then user faces fatigue, the quality of labelling is poor and overall the gains are reduced. In contrast, if set has too few candidates and the machine retrains frequently, the overall duration to complete active learning increases and user waits for a long time.

The instant invention is aimed at determination of candidates for active learning by considering human response and the quality of labelling that is performed.

SUMMARY

Disclosed are a system, method and apparatus for classification of data in a machine learning system.

In one aspect, a method for classification of data in a machine learning system through one or more computer processors is disclosed. Further, generating, through one or more computer processors, a data classifier using a first dataset and determining an accuracy value of the data classifier to achieve a predefined model accuracy threshold. Still further, iterating, through one or more computer processors, calibration of the first dataset based on a set of parameters until the accuracy value matches or exceeds the predefined model accuracy threshold value. Further, the calibration comprises a user input to indicate a correctness of a presented subset of data from a second dataset and using the above to generate an enhanced data classifier for the classification of data.

In another aspect the data classifier is generated, through one or more computer processors, based on a training data available for the first dataset.

In yet another aspect the calibration is performed, through one or more computer processors, based on the set of parameters comprising one or more of a certainty score, a click utilization value, a certainty threshold value, a model accuracy value, an average machine learning time and an average annotation time or a combination thereof.

In a further aspect of the invention, the certainty threshold is dynamically adjusted based on a set of parameters, through one or more computer processors, until the predefined model accuracy threshold is achieved.

In yet another aspect of the invention, the user input received over the presented subset of data is used to generate, through one or more computer processors, the click utilization and the average annotation time.

In one more aspect, the presented subset of data is generated, through one or more computer processors, from the second dataset based on the certainty threshold value and a computed candidate vector distance.

In an additional aspect, iterating of the calibration further comprises coupling the presented subset of data with the user input and the training data until the predefined model accuracy threshold is achieved.

In another aspect, a system for classification of data in a machine learning system includes a computer network, one or more processors communicatively coupled with the computer network, a storage location, that receives an input stream of unstructured data associated with the storage location. Further, generating, through one or more computer processors, a data classifier using a first dataset and determining an accuracy value of the data classifier to achieve a predefined model accuracy threshold. Still further, iterating, through one or more computer processors, calibration of the first dataset based on a set of parameters until the accuracy value matches or exceeds the predefined model accuracy threshold value. Further, the calibration comprises a user input to indicate a correctness of a presented subset of data from the second dataset and using the above to generate an enhanced data classifier for the classification of data.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
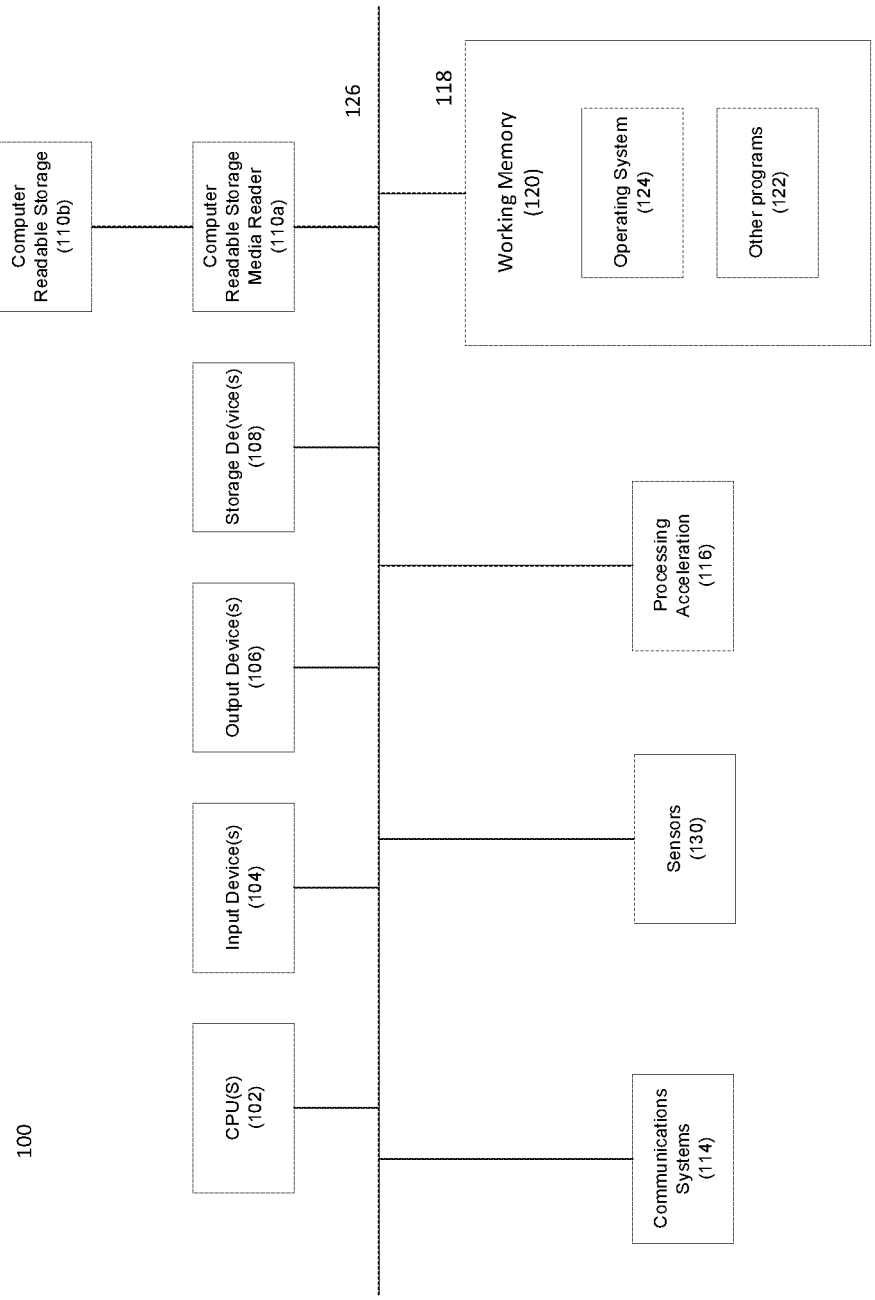
FIG. 1 is a schematic block diagram illustrating the structure of a computer system on which methods of the invention may be embodied.

Other features of the present embodiments will be apparent from the accompanying drawings and from the detailed description that follows.

DETAILED DESCRIPTION

Exemplifying embodiments, as described below, may be used to provide a method, an apparatus and/or a system for classification of data in a machine learning system Although the present embodiments have been described with reference to specific example embodiments, it will be evident that various modifications and changes may be made to these embodiments without departing from the broader spirit and scope of the various embodiments.

The present invention relates to systems and methods of automating the data labelling task and determining a set of data that are ambiguous. Subsequently presenting that set of data to the user for classification and annotation. This process of determining the candidates for human annotation is central to the concept of active learning. The present invention proposes a method for determining the candidates for disambiguation in each iteration using user metrics and other machine learning metrics. The present invention proposes a method for determining the candidates for disambiguation in each iteration using machine learning metrics such as but not limited to certainty score, certainty threshold and computed candidate vector distance. The method is also characterized by the use of user metrics, as will be described in detail in subsequent sections.

Embodiments may use machine learning techniques that may be performed using a computing device. The computing device may be initially taught to perform the annotation. Subsequently, samples may be categorized in accordance with one or more potential labels. To categorize a sample set of data, the data may be provided as input to the computing device, and the computing machine may be configured to provide a label for the sample.

In the current state-of-the-art, various approaches are followed to select data in active learning systems for human annotation and disambiguation. Some of these methods are heuristic approaches such as random sampling or determining the entropy of the data. Others use clustering approaches where a group of similar sentences (or image) of the corpus are considered together and the outliers are chosen for labelling.

All of these methods have one common limitation. The optimization of user response time is characterized by the time a user takes to label the data and the fatigue encountered during the tagging or labelling. The traditional methods of gauging and using the user response time are either not optimal or not sufficiently evolved to provide the benefits that are desired by use of active machine learning techniques. This factor results in bearing a negative impact on the quality of tagging performed by the user.

The method and systems described in the present invention improves the overall efficiency of tagging as compared to other active learning techniques. Further, the time taken by a user in tagging the set of candidates, is optimized, thereby resulting in reduction in the number of candidates presented to the user for tagging and also reduces the overall time taken for tagging.

FIG. 1, The active learning model for data classification in a machine learning system may be embodied on computation devices, a typical structure for which is shown schematically in FIG. 1. This block diagram broadly illustrates how individual system elements may be implemented in a separated or more integrated manner. The computational device 100 comprises of hardware elements that are communicatively and electronically coupled via bus 126, including a host processor 102, an input device 104, an output device 106, a storage device 108, a computer-readable storage media reader 110a and 110b, a communications system 114, a processing acceleration unit 116 such as a DSP or special-purpose processor, and a memory 118. The computer-readable storage media reader 110 a is further connected to a computer-readable storage medium 110b, the combination comprehensively representing remote, local, fixed, and/or removable storage devices plus storage media for temporarily and/or more permanently containing computer-readable information. The communications system 114 may comprise a wired, wireless, modem, and/or other type of interfacing connection and permits data to be exchanged. Sensor connection 130 can be included that can be used to couple with a sensor or other data input device. Sensor interface 130, in some embodiments, can input data for real time processing. In other embodiments, sensor interface 130 can input data into storage devices 108 for processing at a later time. Any type of sensor can be used that provides input data signals and/or outcomes.

Computational device 100 can also include software elements, shown as being currently located within working memory 120, including an operating system 124 and other code/program 122, such as a program designed to implement methods of the invention such as classification of data in a machine learning system, disclosed throughout the specification. The machine learning system may include a database or equivalent storage scheme known in the art for storage of data used and generated in the process of classification of data. It will be apparent to those skilled in the art that substantial and justifiable variations may be made in accordance with specific requirements. For example, customized hardware might also be used and/or particular elements might be implemented in hardware, software (including portable software, such as applets), or both. Further, connection to other computing devices such as network input/output devices may be employed.

For the sake of clarity and to set a scope for the terms used in the context of the present invention, definitions to the subsequently user terms are provided here below. The definitions of the terms should not be considered limiting in their scope and a broader meaning, as evident to a person skilled in the art, may be considered to address any ambiguity.

In one embodiment, Average time to tag a candidate is to be broadly interpreted as the average time consumed by the user (Thuman) to annotate a candidate. This is affected by factors such as latency of the system to display the data, the fatigue and interruptions at the end of the user, associated with the labelling process.

In another embodiment, time distribution for tagging is to be broadly interpreted as the time consumed by a user to annotate for disambiguating the candidates which are a factor of time spent by the annotator labelling the candidates, type and rework of the annotated data and count of the candidates submitted for review.

In one more embodiment, click utilization is to be broadly interpreted as the percentage of candidates that are annotated by the user in comparison to the displayed candidates. High click utilization implies higher and better utilization of user's time. If the utilization is low, then the computational system resources and user's time is wasted. This means a higher click utilization is desirable.

In another embodiment, Certainty Score is to be broadly interpreted as the ratio of its maximum probability to the mean probability value over various classes. The pool of unlabeled dataset at every iteration of the learning process is given to the data classifier. The data classifier determines the prediction probability of a candidate belonging to the target classes. The certainty score is computed for every candidate in the data set. A candidate with lower certainty score implies higher ambiguity.

In yet another embodiment, certainty threshold is used to determine if a candidate will be taken up for disambiguation by the user or not. This certainty threshold is critical to the efficiency of the active learning algorithm, and needs to be dynamically adjusted in real-time. All the candidates that have a certainty score below the certainty threshold may be passed to the next stage. For e.g. if the certainty threshold is 0.7 all the candidates with the certainty score below 0.7 will be passed to the next stage.

In further another embodiment, candidate vector distance is to be broadly interpreted as a pairwise distance metric computed for the candidates to determine their similarity. The basis for similarity measure is their vector space representation. Cosine similarity method is used to compute the distance. It takes a value between 0 and 1. The value 1 indicates that they are close or are similar and the value 0 indicates that they are not similar.

In one more embodiment, average time to train the machine is to be broadly interpreted as average time consumed by the machine, Tmachine, to complete the learning process with all the tagged data in one iteration. This measure is affected by factors such as volume and variety of the data used in every iteration.

In other embodiment, time distribution for machine learning is to be broadly interpreted as the time taken by the machine to complete the machine learning process which is a factor of size of the data and variety of the data points used in each and every iteration of the machine learning process.

In one more embodiment, Nature of the data is to be broadly interpreted to signify the variety of data points used which can be either images or text.

In another embodiment, the density of the clusters formed from computing candidate vector distance is used to assign the priority for disambiguation of candidates. Cluster size is to be broadly interpreted as the density of the each such clusters. Higher the candidate cluster size, higher is the priority given to the points in the cluster.

In yet another embodiment, Model accuracy is to be broadly interpreted as the accuracy of the data classifier in its current iteration. Accuracy denotes the percentage of candidates correctly tagged by the data classifier out of the total number of candidates provided for tagging.

In a further embodiment, active candidates are the data points selected for disambiguation by the user. The candidates are determined by using certainty score and certainty threshold, which is dynamically adjusted in real time using human, machine and data parameters.

In another embodiment, the user annotated dataset is partially used to provide a feedback for training the data classifier. The enhanced data classifier is used for labelling or annotating the remaining user annotated dataset. The data classifier is further used to compare data classifier provided labels with user annotated labels for determining the accuracy value of the data classifier.

In one more embodiment, the accuracy value of the data classifier may be determined by performing the classification of a third dataset. The labels provided through the data classifier are compared with the labels obtained in a previous classification for the third dataset. The labels obtained during previous classification for the third dataset may be obtained after annotation by a human or any other technique well known in the art.

In one embodiment, active learning time is total learning time which is sum total of time taken by the user for tagging and machine learning time to obtain the final deliverable. Final deliverable is the machine learning model that has either achieved the predefined model accuracy threshold or has seen all the unlabeled data post user tagging. The predefined model accuracy threshold may be user defined. For example, the predefined model accuracy threshold may be set at 90%.

In another embodiment, stopping criteria is met when the desired/predefined model accuracy threshold from the machine learning process is achieved.

In one more embodiment, a model accuracy value is described as a percentage score indicating number of correct predictions that the model was able to make in any given tagged dataset.

Figure 2:
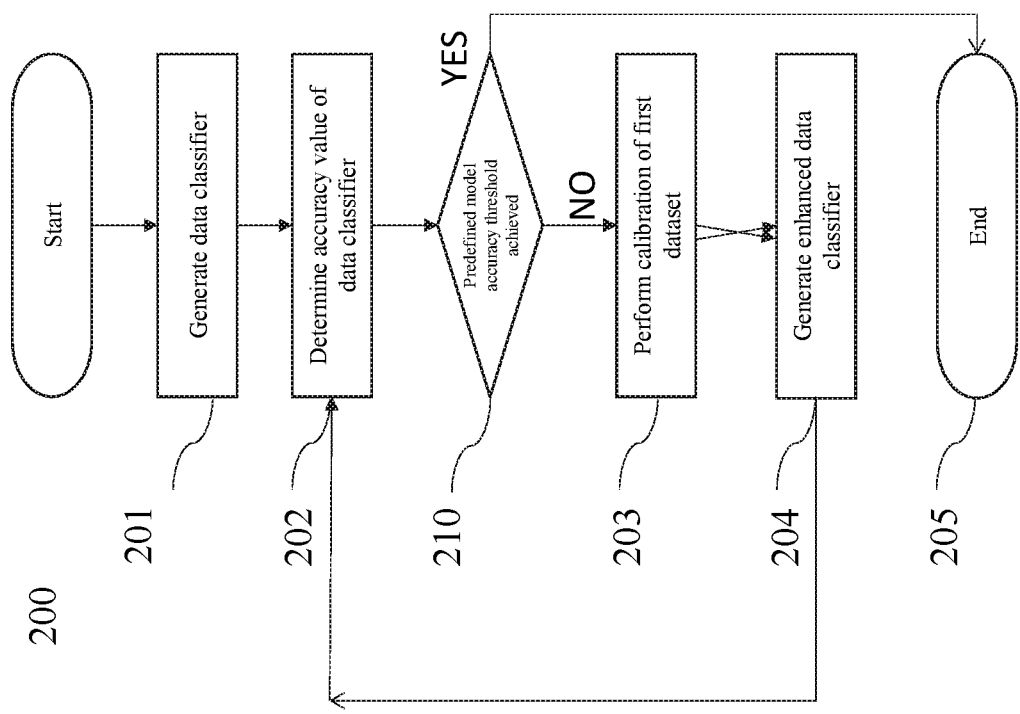
FIG. 2 is a flow diagram of a data classification method and process steps.

FIG. 2. In another embodiment of the invention a method (200) for classification of data in a machine learning system through one or more computer processors is disclosed. Further a data classifier is generated (201) by one or more computer processors, using a first dataset. An accuracy value of the data classifier is determined (202) to achieve a predefined model accuracy threshold. If the accuracy value, matches or exceeds the predefined model accuracy threshold (203), the desired accuracy value of the process is considered to be achieved and the process stops. If the accuracy value does not match or exceeds predefined model accuracy threshold, the process of calibration of the first dataset based on a set of parameters is iterated, until the accuracy value matches or exceeds the predefined model accuracy threshold value. Further, the calibration comprises a user input to indicate a correctness of a presented subset of data from the second dataset and using the above to generate (204) an enhanced data classifier for the classification of data.

Figure 3:
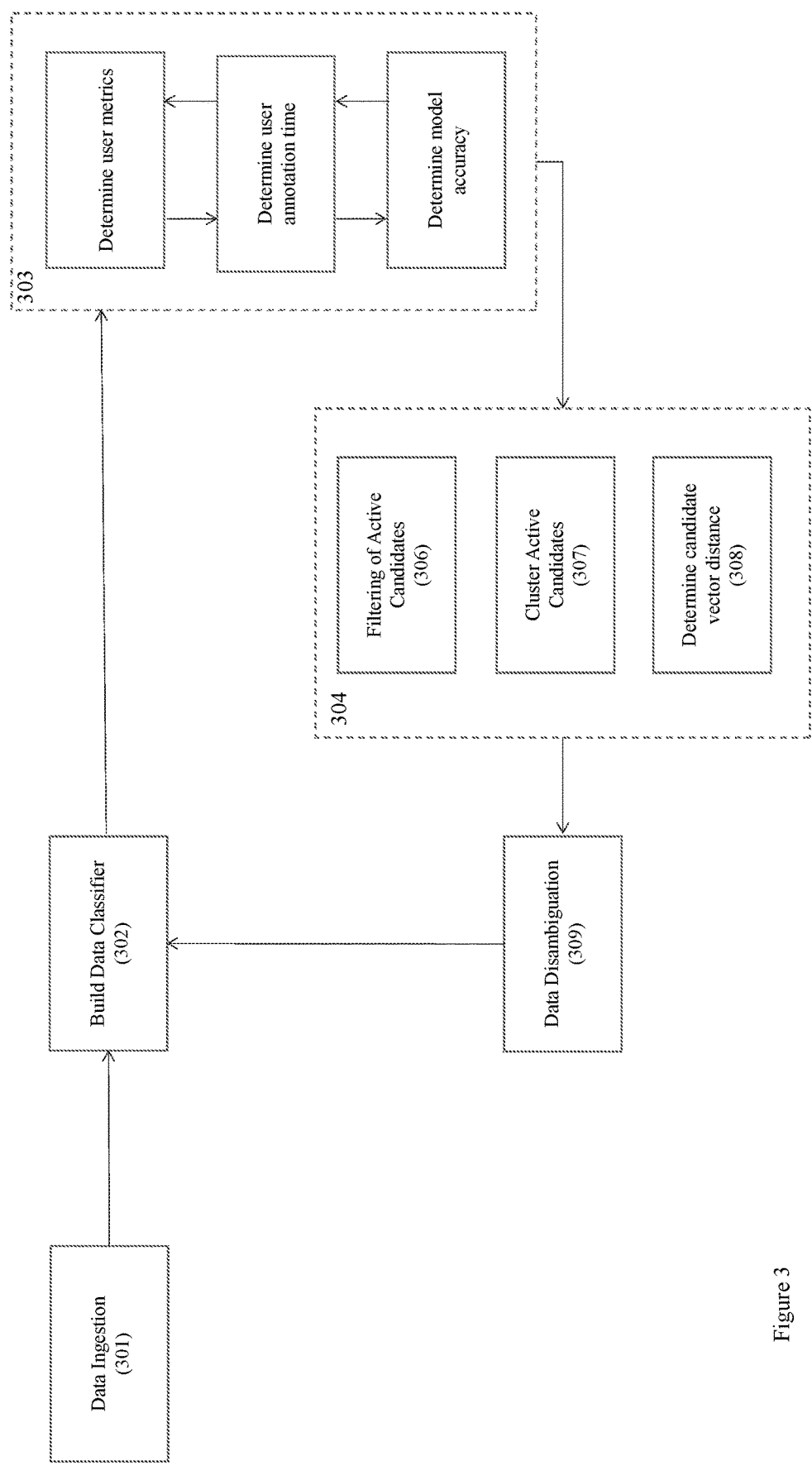
FIG. 3 is a representation of the working of the invention and will be described in detail here below in reference to a classifications undertaken.

FIG. 3. The working of the invention will be described in detail here below in reference to a classification undertaken for unstructured data in the form of the supplier contract documents. The structure of the document may vary with the location and organization. The data in the form of contract documents may be provided to the computer system from different data sources. This data is then cleaned, tokenized and vectorized for machine learning tasks using known techniques. The step is termed as data ingestion (301) for the sake of explanation and clarity.

The initial labeled data called seed data is used to build the data classifier (302) to label the pool of unlabeled data. In subsequent iterations of the method, the data classifier may be updated and enhanced, as will be described in relevant sections below. The data classifier is generated, through one or more computer processors, based on a training data available for the first dataset. The training data may comprise labels/annotations available for the first data set which, in the current scenario, is the seed data. The machine learning classification model may use clauses in the contracts and the labels corresponding to the clauses as initial training data/seed data. The evaluation of the confidence of the system in identifying an unlabeled clause is performed, characterized by the determination of certainty score. An expert user may label only the dataset where the certainty score drops below a predefined certainty threshold. The data classifier may be trained using this labelled data in combination with the first dataset.

During the first iteration of model building, hereinafter also referred as Build stage (302), initial seed data may be used to train the data classifier and the user metrics and machine learning metrics may be fixed at a predefined value The user metrics may comprise of, but not limited to, average time to tag a candidate, time distribution for tagging each cycle and cycle to cycle, and click utilization. The cycle is defined as Time distribution for tagging the presented subset of unlabeled data in each cycle and the cycle to cycle time is defined as time distribution in subsequent cycles.

The Machine Learning metrics may comprise of, but not limited to certainty score, certainty threshold, candidate vector distance, average time to train the machine, time distribution for machine learning, nature of data, candidate cluster size and model accuracy.

During the subsequent iterations of model building, the disambiguated data may be coupled with the training data from previous iterations The user metrics and machine learning metrics may be determined during the evaluate and compute stage as is described subsequently. The outcomes may be evaluated in the evaluate stage (303) to determine the values for user and machine learning metrics.

In one or more embodiments, a certainty score may be computed after every iteration of training the data classifier. The certainty score may be used to group and select the ambiguous candidates for labeling.

In one or more embodiments, click utilization is determined. Click utilization may increase if the user has to annotate all the active candidates presented for disambiguation. As the percentage of user clicks decreases, certainty threshold is dynamically adjusted to increase this percentage. In another embodiment, the certainty threshold may be decreased so that candidates with lower certainty score are passed on the next stage. This in turn leads to increase in the percentage of user clicks.

In one or more embodiments, certainty threshold may be adjusted dynamically in each iteration of training the data classifier based on click utilization. The number of active candidates selected for disambiguation is dependent on this certainty threshold.

In another embodiment, the model accuracy is determined. The model accuracy is a measure of the accuracy of the data classifier in its current iteration. This determination is instrumental in the process of iterating the steps for arriving at a stopping criterion for the process.

In one embodiment, the time taken by the user for labeling or annotating the active candidates that form the ambiguous points, is determined and recorded. The average value of the time taken for such annotation is recorded as a user metric. This metric may be used in the calibration process which will be discussed subsequently.

In yet another embodiment, time taken by machine learning model during the training stage may be recorded. This time is controlled by adjusting the certainty threshold to restrict the number of active candidates presented to the user for labeling or annotating the active candidates. The machine learning time is directly proportional to the number of active candidates. Machine learning time may vary in the different iterations and the average of these recorded times is determined and may be used in the calibration process as yet another metric. The user annotation time is the time taken for labelling the subset of date presented for disambiguation. The certainty threshold is dynamically adjusted in order to reduce the user annotation time. The user annotation time is directly proportional to the number of active candidates.

In one or more embodiments the above mentioned machine learning metrics and user metrics are monitored and analyzed and certainty threshold is dynamically adjusted to optimize machine learning and user metrics.

In one or more embodiment, the compute stage (304) comprises filtering (306) the candidates based on the certainty threshold value. All the candidates that have a certainty score below the certainty threshold may be passed to the next stage. Number of active candidates presented is directly proportional to the certainty threshold value. As the certainty threshold value increases, the number of active candidates that are selected for filtering also increases.

In another embodiment, the compute stage comprises clustering (307) the filtered active candidates based on the determination (308) of their candidate vector distance. Candidate vector distance is a pairwise distance metric computed for the candidates to determine their similarity. A cosine similarity method may be used to compute candidate vector distance. The candidate vector distance may take a value between 0-1. The value 1 may indicate that they are completely similar and the value 0 may indicate that they are completely dissimilar. The vector distance is used for creating clusters/groups using any of the known algorithms, for example KMeans Clustering. The clustering is performed to reduce the number of candidates presented to the user for labelling. This is achieved by presenting the candidates best representing the clusters and lying at the periphery of the clusters, to a user for disambiguation, The density of the groups indicates the priority given to candidates from the particular groups, i.e., these candidates are displayed first for disambiguation.

In one or more embodiment, the active candidates may be presented to the user for disambiguation (309) by labeling or annotating. The annotated candidates are coupled with the training data before proceeding to a subsequent build stage (302). The active learning process stops when the stopping criteria of achieving predefined model accuracy threshold by the machine learning process is achieved. Another stopping criterion may be until all the clauses in the contract are labelled.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-Ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for data classification in a machine learning system, the method comprising:
generating, by a computing device, using training data a data classifier for a first dataset;
and
iterating, by the computing device, calibration of the data classifier based on a set of one or more parameters until an accuracy value for the data classifier matches or exceeds a predefined model accuracy threshold value, wherein the calibration comprises:
receiving a user input comprising an annotation of a presented subset of the first dataset to thereby disambiguate the presented subset of data, wherein the annotation comprises an indication of correctness;
generating using the disambiguated subset of data and the training data an enhanced version of the data classifier; and
determining the accuracy value based on an application of the enhanced version of the data classifier on at least another subset of the first dataset.

2. The method of claim 1, wherein the set of parameters further comprises a certainty score, a click utilization value, a certainty threshold value, a model accuracy value, an average machine learning time, or an average annotation time.

3. The method of the claim 1, wherein the set of parameters comprises at least a certainty threshold value and a number of candidates included in the presented subset of data is determined based on the certainty threshold value.

4. The method of claim 2, wherein the user input received over the presented subset of data is used to generate the click utilization value or the average annotation time.

5. The method of claim 1, further comprising generating, by the computing device, the presented subset of data based on a plurality of clusters created based on computed candidate vector distances.

6. The method of claim 1, wherein the first dataset comprises a plurality of candidates, the set of parameters comprises a certainty threshold value, and the method further comprises:
generating, by the computing device, a certainty score for each of the plurality of candidates in a current iteration of the calibration;
comparing, by the computing device, the certainty score to the certainty threshold value; and
determining, by the computing device, based on the comparison a number of the plurality of candidates included in the presented subset of data in a subsequent iteration of the calibration.

7. The method of claim 6, further comprising:
generating, by the computing device, a click utilization value or an average annotation time based on the user input, wherein the click utilization value comprises a percentage of the plurality of candidates that are annotated by the user in the current iteration of the calibration; and
adjusting, by the computing device, for the subsequent iteration of the calibration the certainty threshold value based on the click utilization value or the average annotation time.

8. A data classification system comprising:
a processor; and
a memory coupled to the processor and comprising programmed instructions stored thereon that, when executed by the processor, are configured to cause the processor to:
generate using training data a data classifier for a first dataset;
and
iterate calibration of the data classifier based on a set of one or more parameters until an accuracy value for the data classifier matches or exceeds a predefined model accuracy threshold value, wherein the calibration comprises:
receiving a user input comprising an annotation of a presented subset of the first dataset to thereby disambiguate the presented subset of data, wherein the annotation comprises an indication of correctness;
generating using the disambiguated subset of data and the training data an enhanced version of the data classifier; and
determining the accuracy value based on an application of the enhanced version of the data classifier on at least another subset of the first dataset.

9. The system of claim 8, wherein the set of parameters further comprises a certainty score, a click utilization value, a certainty threshold value, a model accuracy value, an average machine learning time, or an average annotation time.

10. The system of the claim 8, wherein the set of parameters comprises at least a certainty threshold value and a number of candidates included in the presented subset of data is determined based on the certainty threshold value.

11. The system of claim 9, wherein the programmed instructions, when executed by the processor, are further configured to cause the processor to generate the click utilization value or the average annotation time based on the user input received over the presented subset of data.

12. The system of claim 8 wherein the programmed instructions, when executed by the processor, are further configured to cause the processor to generate the presented subset of data based on a plurality of clusters created based on computed candidate vector distances.

13. A non-transitory computer readable medium including instruction for data classification stored thereon that when executed by at least one processor cause the at least one processor to:
generate using training data a data classifier for a first dataset;
and
iterate calibration of the data classifier based on a set of one or more parameters until an accuracy value for the data classifier matches or exceeds a predefined model accuracy threshold value, wherein the calibration comprises:
receiving a user input comprising an annotation of a presented subset of the first dataset to thereby disambiguate the presented subset of data, wherein the annotation comprises an indication of correctness;
generating using the disambiguated subset of data and the training data an enhanced version of the data classifier; and
determining the accuracy value based on an application of the enhanced version of the data classifier on at least another subset of the first dataset.

14. The non-transitory computer readable medium of claim 13, wherein the set of parameters further comprises a certainty score, a click utilization value, a certainty threshold value, a model accuracy value, an average machine learning time, or an average annotation time.

15. The non-transitory computer readable medium of the claim 13, wherein the set of parameters comprises at least a certainty threshold value and a number of candidates included in the presented subset of data is determined based on the certainty threshold value.

16. The non-transitory computer readable medium of claim 14, wherein the instructions, when executed by the processor, further cause the processor to generate the click utilization value or the average annotation time based on the user input received over the presented subset of data.

17. The non-transitory computer readable medium of claim 13 wherein the instructions, when executed by the processor, further cause the processor to generate the presented subset of data based on a plurality of clusters created based on computed candidate vector distances.

* * * * *